(12) United States Patent
Park

(10) Patent No.: US 12,715,695 B2
(45) Date of Patent: Aug. 25, 2026

(54) ARTICLE TRANSFER APPARATUS AND ARTICLE TRANSFER METHOD

(71) Applicant: SEMES CO., LTD., Cheonan-si (KR)

(72) Inventor: No Jae Park, Seoul (KR)

(73) Assignee: SEMES CO., LTD., Cheonan-si (KR)

( * ) Notice: Subject to any disclaimer, the term of this patent is extended or adjusted under 35 U.S.C. 154(b) by 502 days.

(21) Appl. No.: 18/211,098

(22) Filed: Jun. 16, 2023

(65) Prior Publication Data

US 2023/0406631 A1 Dec. 21, 2023

(30) Foreign Application Priority Data

Jun. 17, 2022 (KP) ........................ 10-2022-0073933

(51) Int. Cl.
*B65G 1/137* (2006.01)
*B65G 1/04* (2006.01)
*B65G 43/08* (2006.01)

(52) U.S. Cl.
CPC ........... *B65G 1/137* (2013.01); *B65G 1/0492* (2013.01); *B65G 43/08* (2013.01); *B65G 2203/0233* (2013.01); *B65G 2203/041* (2013.01); *B65G 2203/046* (2013.01)

(58) Field of Classification Search
CPC ..... B65G 1/137; B65G 1/0492; B65G 1/0457
See application file for complete search history.

(56) References Cited

U.S. PATENT DOCUMENTS 9,758,308 B1 * 9/2017 Nishikawa ........ H01L 21/67715
2021/0331714 A1 * 10/2021 Wada .................. H04N 13/204

FOREIGN PATENT DOCUMENTS

JP 2003-321102 11/2003
JP 2003321102 A * 11/2003
KR 10-1016023 2/2011
KR 10-1419348 7/2014
KR 10-2017-0116581 10/2017
KR 10-2018-0093155 8/2018
KR 10-2019-0047899 5/2019
KR 20190047899 A * 5/2019 ............. H10P 72/34
KR 10-2021-0012121 2/2021
KR 10-2021-0130651 11/2021

OTHER PUBLICATIONS

English translation JP2003321102 (Year: 2003).*
English translation KR20190047899 (Year: 2019).*
Office Action from the Korean Intellectual Property Office dated Dec. 5, 2023.

* cited by examiner

*Primary Examiner* — Jason L Vaughan
*Assistant Examiner* — Amanda Kreiling

(57) ABSTRACT

Provided is an article transfer apparatus and article transfer method capable of autonomously loading or unloading an article by accurately checking a correct position in an article storage without a teaching process, the article transfer apparatus including a carriage body travelling along travel rails to transfer an article, and a position detection device mounted in the carriage body to detect position information related to a correct position from a detection target mounted in an article storage capable of storing the article in order to place the article at the correct position in the article storage where the article is to be stored.

18 Claims, 15 Drawing Sheets

ARTICLE TRANSFER APPARATUS AND ARTICLE TRANSFER METHOD

CROSS-REFERENCE TO RELATED PATENT APPLICATION

This application claims the benefit of Korean Patent Application No. 10-2022-0073933, filed on Jun. 17, 2022, in the Korean Intellectual Property Office, the disclosure of which is incorporated herein in its entirety by reference.

BACKGROUND OF THE INVENTION

1. Field of the Invention

The present invention relates to an article transfer apparatus and article transfer method and, more particularly, to an article transfer apparatus and article transfer method capable of autonomously loading or unloading an article by accurately checking a correct position in an article storage without a teaching process.

2. Description of the Related Art

To increase semiconductor manufacturing efficiency, not only technologies for improving various processes performed by semiconductor manufacturing systems (e.g., exposure, deposition, etching, ion implantation, and cleaning) but also systems for more effectively transferring an article (e.g., a container storing wafers, a front opening unified pod (FOUP), or a reticle pod storing reticles) between the semiconductor manufacturing systems are adopted and used. For example, an article transfer apparatus including an overhead hoist transport (OHT) configured to transfer an article while moving along a transfer path provided on the ceiling of a semiconductor factory is used a lot.

The article transfer apparatus including the OHT may include travel rails for providing a transfer path, a vehicle traveling along the travel rails, and a hoist device provided under the vehicle. The hoist device may support an article to be transferred, and the hoist may rotate the article, move the article in a horizontal direction, or lift or lower the article in a vertical direction to place the article in an article storage.

In this case, to place the article at a correct position in the article storage, a teaching process in which a worker initially finds a correct position with naked eyes and places the article at the found position through trial operation or jog operation, and stores a coordinate of the position, a moved distance or speed, or the like in a control unit is required.

SUMMARY OF THE INVENTION

However, according to the above-described general article transfer apparatus, much time, effort, and labor may be required to individually teach numerous correct positions in article storages by relying on senses of a highly-skilled worker, the accuracy or precision of teaching may be very low because the teaching completely relies on the worker, and a collision, a dislocation, a transfer error, or the like of an article may occur due to the difference between actual positions and taught positions when the article storages are slightly deformed due to the accumulation of external force for a long time.

The present invention provides an article transfer apparatus and article transfer method capable of autonomously loading or unloading an article by accurately checking a correct position in an article storage without a teaching process. However, the scope of the present invention is not limited thereto.

According to an aspect of the present invention, there is provided an article transfer apparatus including a carriage body travelling along travel rails to transfer an article, and a position detection device mounted in the carriage body to detect position information related to a correct position from a detection target mounted in an article storage capable of storing the article in order to place the article at the correct position in the article storage where the article is to be stored.

The position detection device may include a camera capable of capturing an image of the detection target.

The position detection device may include a horizontal camera having a horizontal beam angle to capture an image of the detection target which stands vertically in a side track buffer (STB).

The position detection device may include a vertical camera having a vertically downward beam angle to capture an image of the detection target which lies horizontally on an under track buffer (UTB) or an apparatus stage or port.

The position detection device may include a horizontal camera mounted in a portion of the carriage body and having a horizontal beam angle to capture an image of the detection target which stands vertically in a STB, and a vertical camera mounted in another portion of the carriage body and having a vertically downward beam angle to capture an image of the detection target which lies horizontally on a UTB or an apparatus stage or port.

The position detection device may include a variable camera mounted in a portion of the carriage body and having a beam angle variable between a horizontal direction and a vertical downward direction to capture an image of the detection target which stands vertically in a STB and an image of the detection target which lies horizontally on a UTB or an apparatus stage or port.

The detection target may include a bracket mounted in or near the article storage, and an identifier represented on the bracket or adhered to the bracket in a form of a sticker.

The detection target may selectively include at least one of a circle, concentric circles, a cross, scale marks, vertical scale marks, horizontal scale marks, geometric scale marks, and combinations thereof such that a camera captures an image thereof to recognize a represented reference position.

The detection target may selectively include at least one of a quick response (QR) code, a barcode, an identifier, and combinations thereof such that a camera captures an image thereof to recognize represented information.

The position detection device may include a camera and an information reader, and the detection target may include an information storage device including at least one of a radio-frequency identification (RFID) chip, a near-field communication (NFC) chip, a Bluetooth chip, a Wi-Fi chip, and combinations thereof, which is readable by the information reader.

The detection target may represent at least one of identification information of the article storage, storage position information of the article storage, reference position information, first distance information from the reference position information in a first direction, second distance information from the reference position information in a second direction, third distance information from the reference position information in a third direction, storable article information, manufacturer information, manager information, product identification information, and combinations thereof.

The article transfer apparatus may further include a controller for recognizing a reference position based on an image captured by or information recognized by the position detection device, and recognizing a position spaced apart from the reference position by a first distance in a first direction and by a second distance in a second direction or by a third distance in a third direction, as the correct position in the article storage serving as a center of alignment of the article.

The article transfer apparatus may further include a controller for determining a distance by using a focal length of an image captured by the position detection device.

The carriage body may include a vehicle travelling along the travel rails, and a hoist device mounted under the vehicle to support the article and having the position detection device mounted therein.

The hoist device may include a hoist housing for providing an accommodation space for the article and having the position detection device mounted therein, a hand unit for gripping or ungripping the article, and a hand moving unit for moving the hand unit from the accommodation space to the correct position in the article storage.

According to another aspect of the present invention, there is provided an article transfer method including (a) travelling, by a carriage body, along travel rails to transfer an article, (b) detecting, by a position detection device mounted in the carriage body, position information related to a correct position in an article storage where the article is to be stored, from a detection target mounted in the article storage capable of storing the article, and (c) moving, by the carriage body, the article to the correct position in the article storage to place the article in the article storage.

In step (b), a controller may recognize a reference position based on an image captured by or information recognized by the position detection device, and recognize a position spaced apart from the reference position by a first distance in a first direction and by a second distance in a second direction or by a third distance in a third direction, as the correct position in the article storage serving as a center of alignment of the article.

In step (b), a controller may determine a distance by using a focal length of an image captured by the position detection device.

In step (b), when the article storage is a side track buffer (STB), a horizontal camera having a horizontal beam angle or a variable camera having a beam angle variable from a vertical downward direction to a horizontal direction may be used to capture an image of the detection target which stands vertically or, when the article storage is an under track buffer (UTB) or an apparatus stage or port, a vertical camera having a vertically downward beam angle or a variable camera having a beam angle variable from a horizontal direction to a vertical downward direction may be used to capture an image of the detection target which lies horizontally.

According to another aspect of the present invention, there is provided an article transfer apparatus including a carriage body travelling along travel rails to transfer an article, a position detection device mounted in the carriage body to detect position information related to a correct position from a detection target mounted in an article storage capable of storing the article in order to place the article at the correct position in the article storage where the article is to be stored, and a controller for recognizing a reference position based on an image captured by or information recognized by the position detection device, and recognizing a position spaced apart from the reference position by a first distance in a first direction and by a second distance in a second direction or by a third distance in a third direction, as the correct position in the article storage serving as a center of alignment of the article, wherein the position detection device includes a camera capable of capturing an image of the detection target, wherein the camera includes a horizontal camera having a horizontal beam angle to capture an image of the detection target which stands vertically in a side track buffer (STB), or a vertical camera having a vertically downward beam angle to capture an image of the detection target which lies horizontally on an under track buffer (UTB) or an apparatus stage or port, wherein the carriage body includes a vehicle travelling along the travel rails, and a hoist device mounted under the vehicle to support the article, and wherein the hoist device includes a hoist housing for providing an accommodation space for the article and having the position detection device mounted therein, a hand unit for gripping or ungripping the article, and a hand moving unit for moving the hand unit from the accommodation space to the correct position in the article storage.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
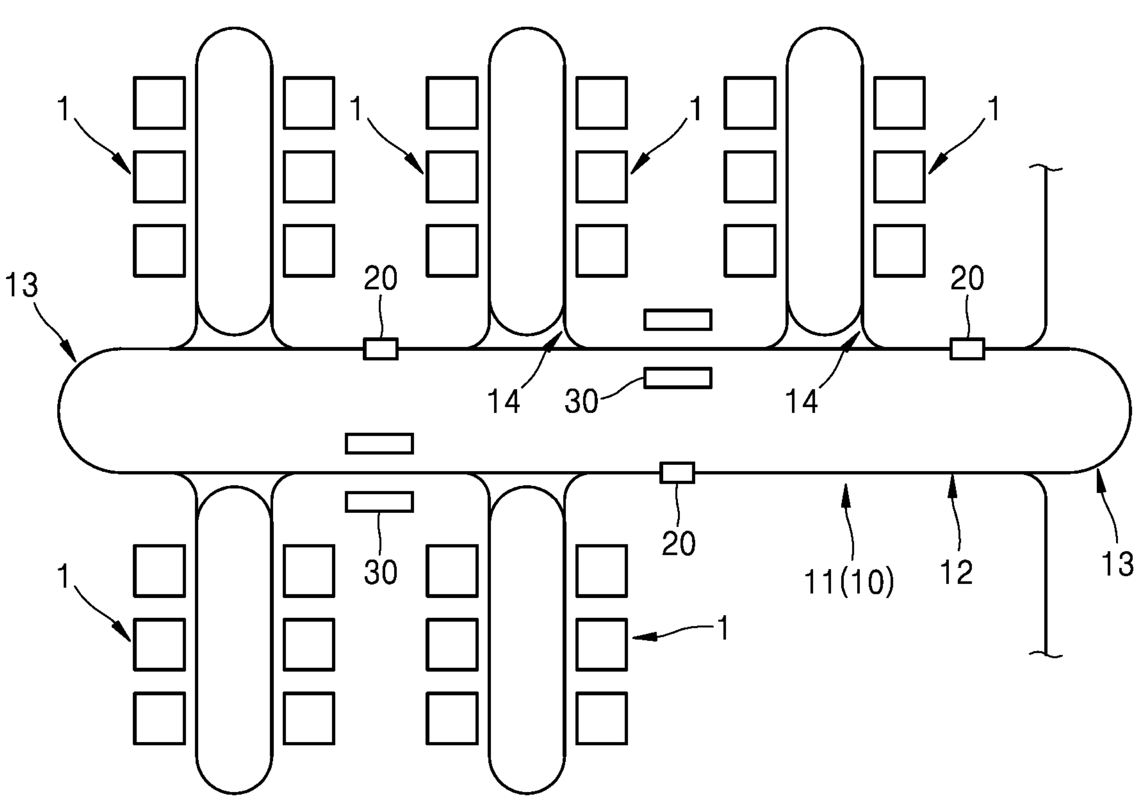
FIG. 1 is a conceptual view showing the overall configuration of an article transfer apparatus according to some embodiments of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

The terminology used herein is for the purpose of describing particular embodiments and is not intended to limit the invention. As used herein, the singular forms “a”, “an”, and “the” are intended to include the plural forms as well, unless the context clearly indicates otherwise. It will be further understood that the terms “comprises” and/or “comprising”, when used in this specification, specify the presence of stated features, integers, steps, operations, elements, components, and/or groups thereof, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Meanwhile, in the drawings, the sizes or shapes of elements, the thicknesses of lines, etc. may be slightly exaggerated for convenience of explanation.

The present invention may be mainly used to transfer an article from an arbitrary position to a desired position in a factory for manufacturing semiconductors or flat panel displays (FPDs). For example, the present invention may be used to transfer the article between semiconductor (or FPD) manufacturing systems. In this case, the article may include a substrate (e.g., a wafer). For example, the article may include a container storing substrates. Furthermore, the container may be a sealed container capable of protecting the carried substrates from an external environment. The sealed container may be a front opening unified pod (FOUP). Alternatively, the container may include a reticle pod storing reticles.

Although the present invention may be used to transfer an article in a variety of fields, embodiments of the present invention will be focused on a case in which a FOUP storing wafers therein is transferred as an article between semiconductor manufacturing systems in a semiconductor factory.

The semiconductor factory may include one or more clean rooms, and semiconductor manufacturing systems for performing semiconductor manufacturing processes may be installed in the clean rooms. Semiconductors may be produced by repeatedly performing semiconductor manufacturing processes on wafers. Wafers on which a specific process is completely performed in a semiconductor manufacturing system may be transferred to a semiconductor manufacturing system for a subsequent process. In this case, the wafers may be transferred by an article transfer apparatus including an OHT while being stored in the FOUP.

FIG. 1 is a conceptual view showing the overall configuration of an article transfer apparatus 20 according to some embodiments of the present invention.

As shown in FIG. 1, according to the overall configuration of the article transfer apparatus 20 according to some embodiments of the present invention, the article transfer apparatus 20 according to some embodiments of the present invention may travel along a transfer path 11 for transferring an article between semiconductor manufacturing systems 1.

A buffer 30 may include one or more article storages for providing a temporary storage space for the article. Travel rails 10 are disposed on the ceiling of a semiconductor factory. The article transfer apparatus 20 may transfer the article between the semiconductor manufacturing systems 1 directly or after temporarily storing the article in the buffer 30.

The buffer 30 may be a side track buffer (STB) mounted at sides of the transfer path 11, or an under track buffer (UTB) mounted under the transfer path 11.

The article transfer apparatus 20 according to some embodiments of the present invention may be an overhead hoist transport (OHT) and include the travel rails 10 and a plurality of article transfer carriages. The above-described article transfer apparatus 20 according to some embodiments of the present invention may be configured to operate by receiving driving power from a power supply device through a power supply unit and a power receiving unit, or to automatically operate by further including an integrated controller called an OHT control system (OCS).

As shown in FIG. 1, the transfer path 11 may include one or more straight sections 12 having a straight line shape, one or more curved sections 13 having a curved line shape, and one or more joint sections 14 for splitting and/or combining paths.

Figure 2:
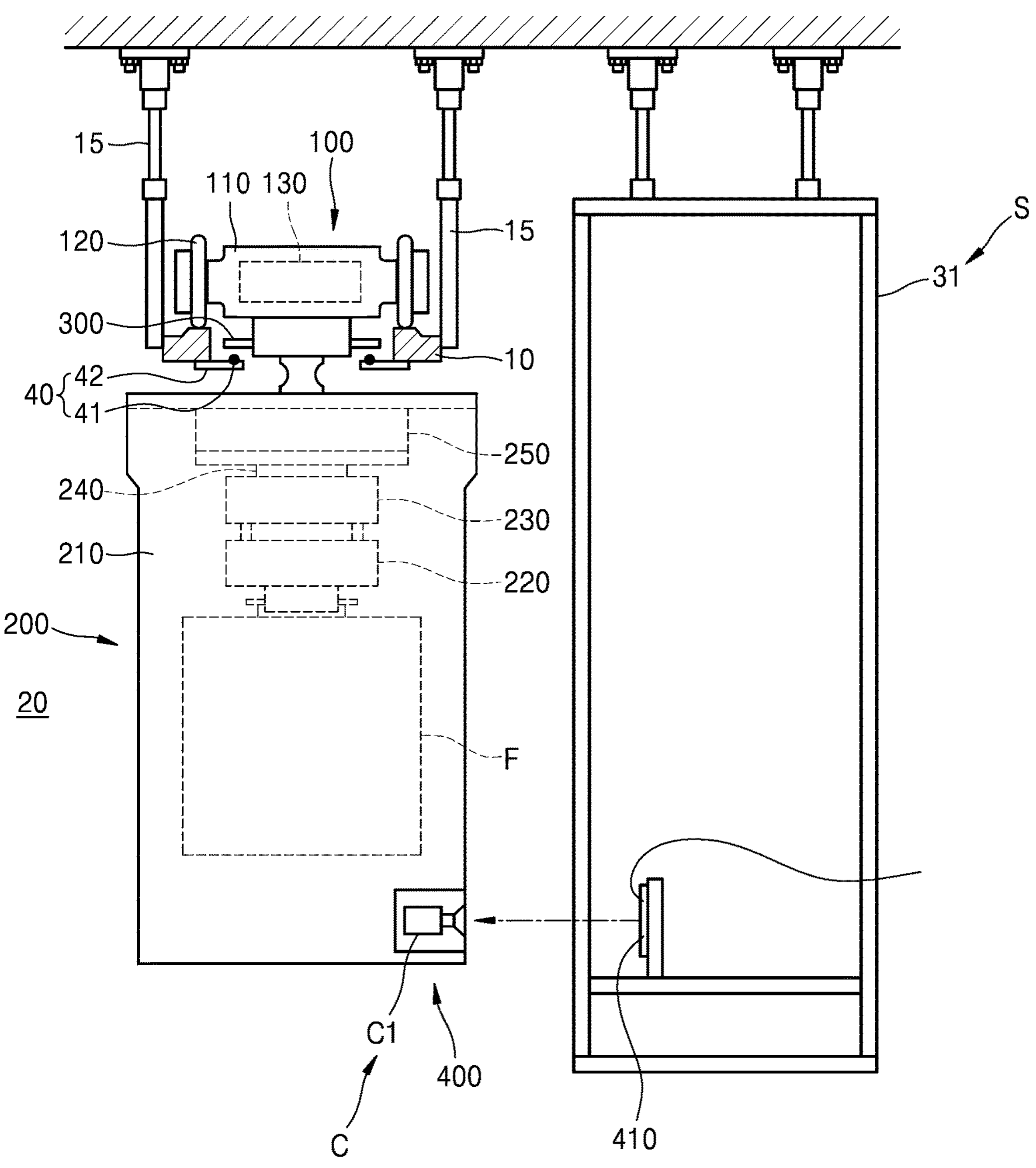
FIG. 2 is a front view showing position detection by the article transfer apparatus of FIG. 1.
Figure 3:
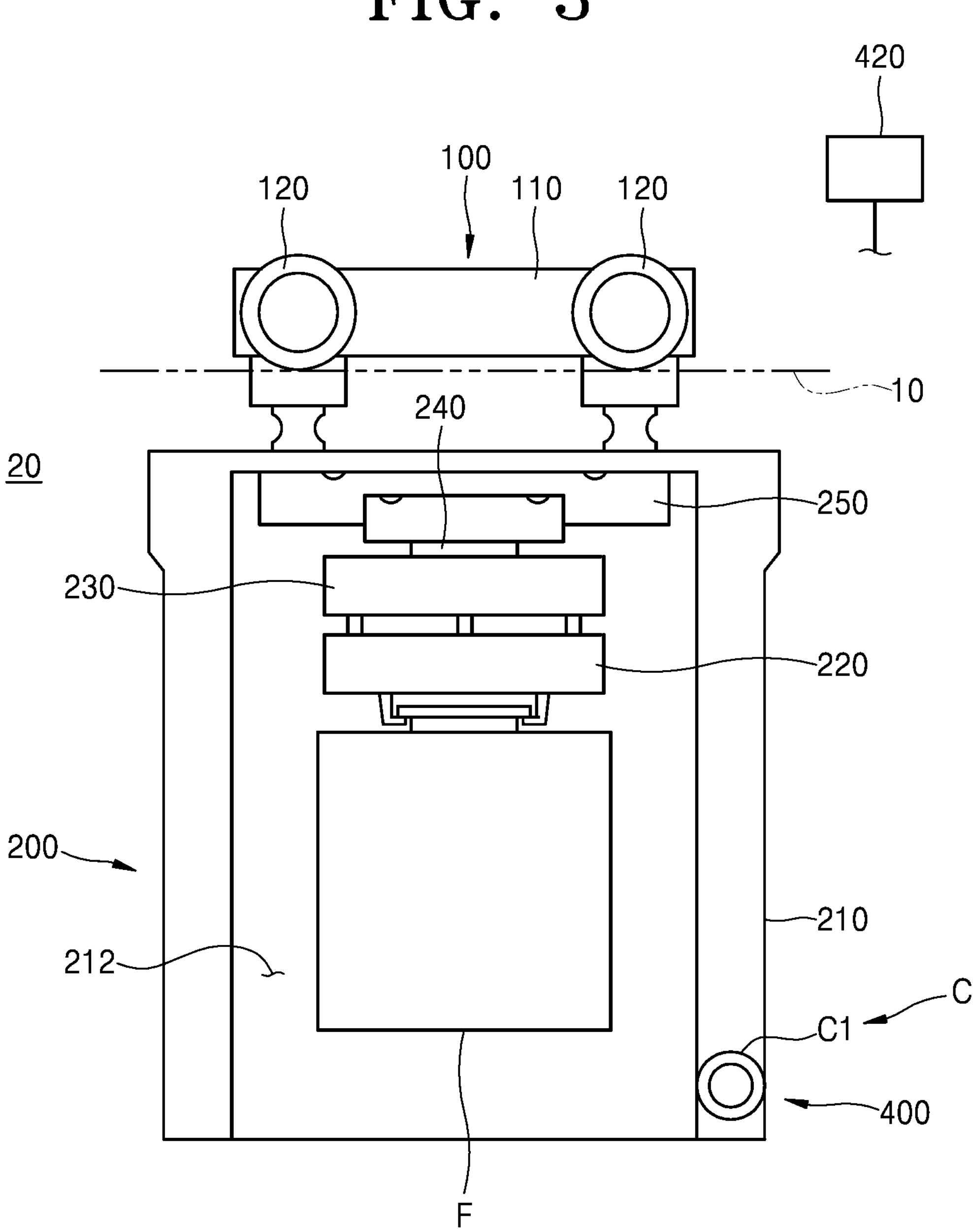
FIG. 3 is a side view of the article transfer apparatus of FIG. 1.

FIG. 2 is a front view showing position detection by the article transfer apparatus 20 of FIG. 1, and FIG. 3 is a side view of the article transfer apparatus 20 of FIG. 1.

As shown in FIGS. 2 and 3, the travel rails 10 may include a pair of rail members spaced apart from each other in a horizontal direction and be mounted on the ceiling of a semiconductor factory by rail supports 15. Lower ends of the rail supports 15 may support the pair of rail members and upper ends thereof may be fixed to the ceiling of the semiconductor factory. The pair of rail members may provide travel surfaces thereon.

As shown in FIG. 2, a power supply unit 40 may include power supply lines 41 mounted along the transfer path 11 under the travel rails 10. A pair of power supply lines 41 may be provided. The power supply lines 41 may be supported by line supports 42 disposed between the pair of rail members and mounted on the travel rails 10. The power supply lines 41 are electrically connected to a power supply device for providing driving power.

Each article transfer apparatus 20 may include a vehicle 100 travelling along the travel rails 10, and a hoist device 200 supporting an article F under the vehicle 100. The hoist device 200 may move together with the vehicle 100 and support the article F.

The vehicle 100 includes a vehicle body 110 and wheels 120. An axle extending in a horizontal direction may be mounted on the vehicle body 110. A plurality of axles may be provided to be spaced apart from each other in a forward-backward direction. The wheels 120 are travel wheels which provide mobility to the vehicle body 110 to travel as guided by the travel rails 10. The wheels 120 may be mounted at both ends of the axle to roll in contact with the travel surfaces of the pair of rail members. The vehicle 100 may further include a wheel drive unit 130 for providing power to rotate the wheels 120. For example, the wheel drive unit 130 may be configured to rotate the axle.

The hoist device 200 includes a hoist housing 210. The hoist housing 210 is connected to the vehicle 100 from under the travel rails 10. The top of the hoist housing 210 may be connected to the bottom of the vehicle body 110 by one or more connectors. The hoist housing 210 may provide an accommodation space 212 for the article F.

The hoist housing 210 may have open left and right sides and bottom to move the article F in leftward, rightward, and downward directions from the accommodation space 212.

The hoist device 200 may further include a hand unit 220 for gripping or ungripping the article F, and a hand moving unit for moving the hand unit 220 between a first position and a second position. The first position may be a position at which the article F gripped by the hand unit 220 is accommodated in the accommodation space 212 of the hoist housing 210, and the second position may be a position outside the hoist housing 210 away from the first position.

The hoist device 200 may include a vertical drive unit 230, a rotary drive unit 240, and a horizontal drive unit 250 as the hand moving unit.

The hand unit 220 may include a hand for gripping or ungripping the article F, and a hand support supporting the hand.

The vertical drive unit 230 may move the hand unit 220 in a vertical direction. The vertical drive unit 230 may move the hand unit 220 in a vertical direction by winding or unwinding one or more belts around a drum. The rotary drive unit 240 may rotate the hand unit 220 about a vertical axis, and the horizontal drive unit 250 may move the hand unit 220 in a horizontal direction. For example, the hand unit 220 may be moved in a vertical direction by the vertical drive unit 230, the vertical drive unit 230 may be rotated about a vertical axis by the rotary drive unit 240, or the rotary drive unit 240 may be moved in a horizontal direction by the horizontal drive unit 250, such that the article F gripped by the hand unit 220 may be moved in a vertical direction, rotated about a vertical axis, or moved in a horizontal direction.

Figure 4:
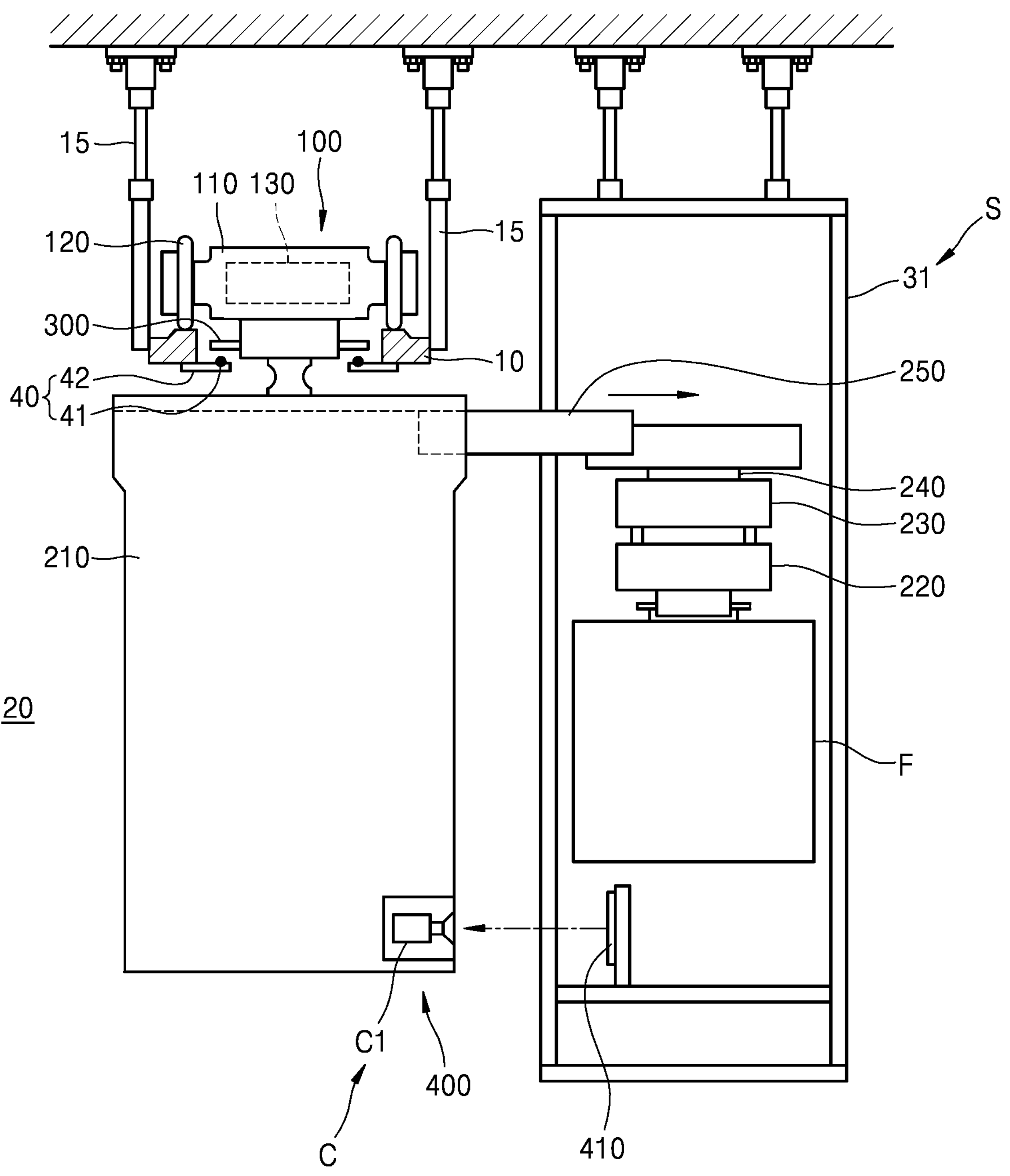
FIG. 4 is a front view showing horizontal transfer by the article transfer apparatus of FIG. 1.
Figure 5:
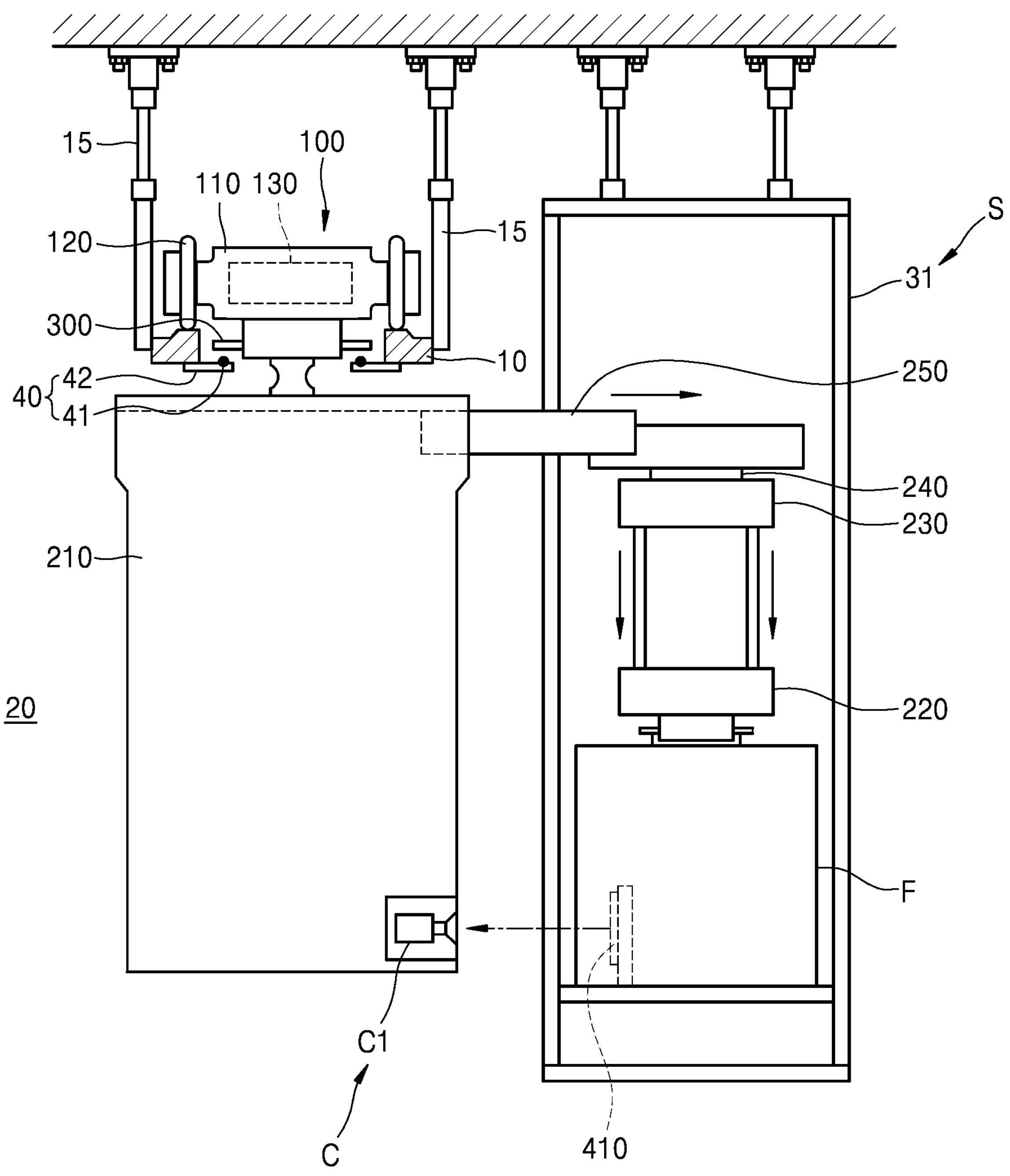
FIG. 5 is a front view of showing vertical transfer by the article transfer apparatus of FIG. 1.
Figure 6:
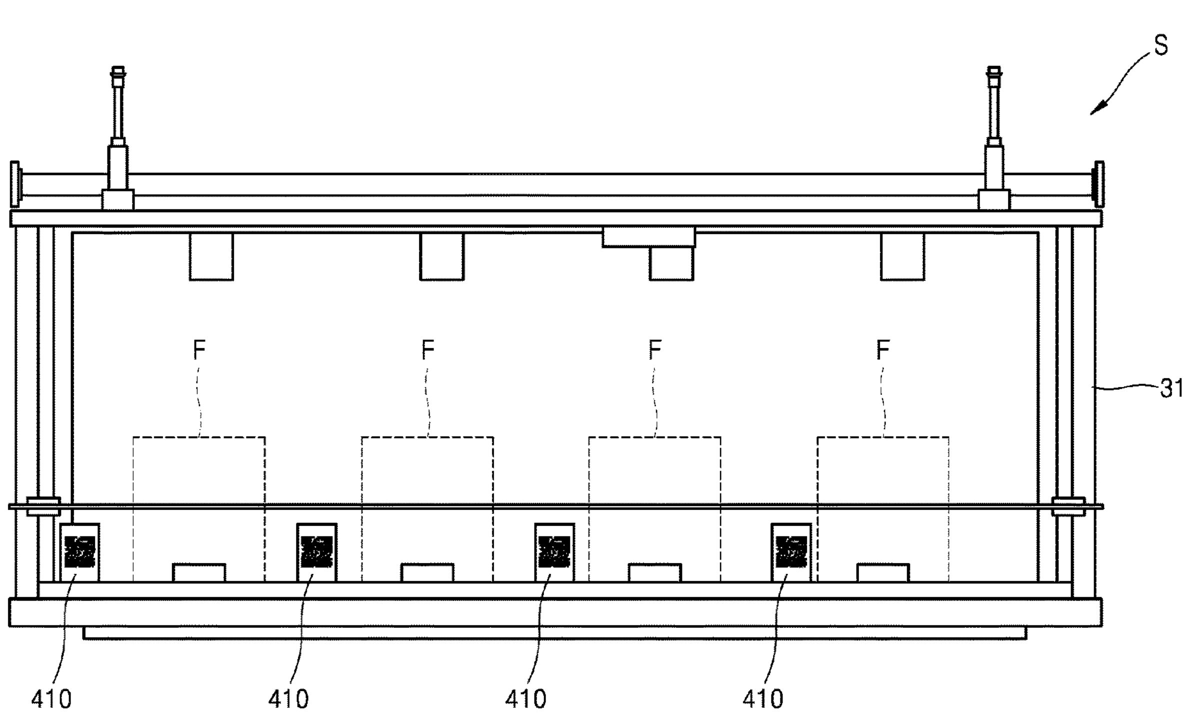
FIG. 6 is a side view of an article storage corresponding to the article transfer apparatus of FIG. 1.
Figure 7:
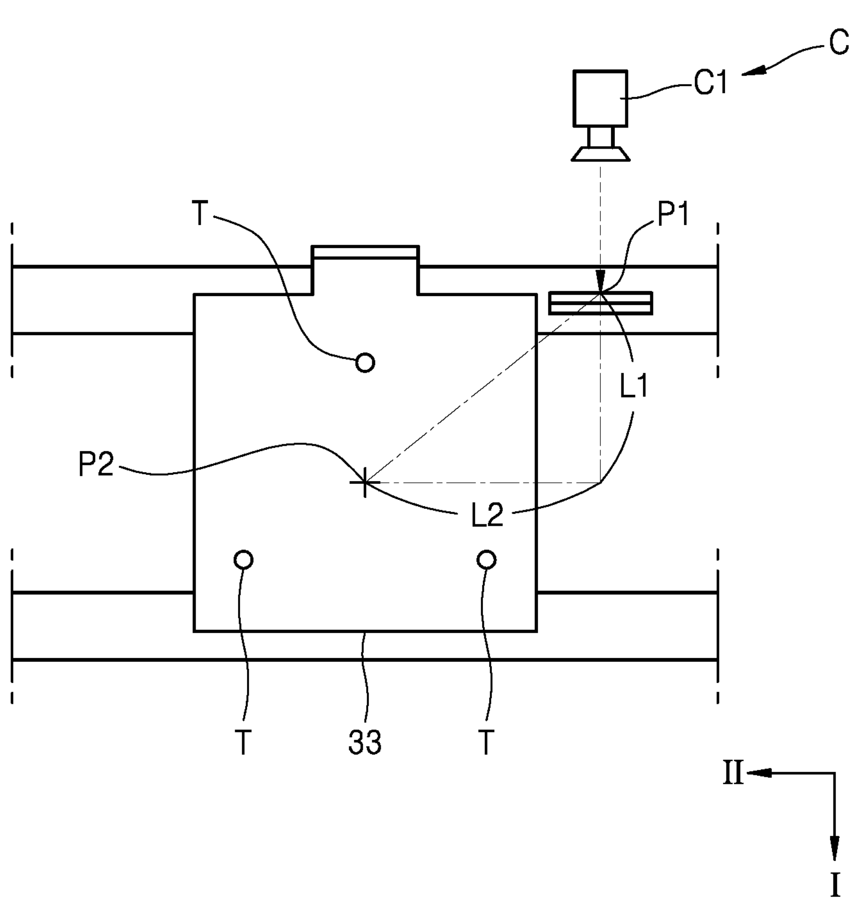
FIG. 7 is a plan view showing position detection by the article transfer apparatus of FIG. 2.

FIG. 4 is a front view showing horizontal transfer by the article transfer apparatus 20 of FIG. 1, FIG. 5 is a front view of showing vertical transfer by the article transfer apparatus 20 of FIG. 1, FIG. 6 is a side view of an article storage S corresponding to the article transfer apparatus 20 of FIG. 1, and FIG. 7 is a plan view showing position detection by the article transfer apparatus 20 of FIG. 2.

As shown in FIGS. 1 to 7, the article transfer apparatus 20 according to some embodiments of the present invention may include a carriage body travelling along the travel rails 10 to transfer the article F, and a position detection device 400 mounted in the carriage body to detect position information related to a correct position P2 from a detection target 410 mounted in the article storage S capable of storing the article F in order to place the article F at the correct position P2 in the article storage S where the article F is to be stored.

As shown in FIG. 4, the position detection device 400 may include a camera C capable of capturing an image of the detection target 410. The position detection device 400 may include a horizontal camera C1 having a horizontal beam angle to capture an image of the detection target 410 which stands vertically in a STB 31.

Herein, the carriage body may include the vehicle 100 travelling along the travel rails 10, and the hoist device 200 mounted under the vehicle 100 to support the article F and having the position detection device 400 mounted therein.

The hoist device 200 may include the hoist housing 210 for providing the accommodation space 212 for the article F and having the position detection device 400 mounted therein, the hand unit 220 for gripping or ungripping the article F, and the hand moving unit for moving the hand unit 220 from the accommodation space 212 to the correct position P2 in the article storage S.

Herein, as described above, the hand moving unit may include the vertical drive unit 230, the rotary drive unit 240, and the horizontal drive unit 250.

The detection target 410 may represent at least one of identification information of the article storage S, storage position information of the article storage S, reference position information, first distance information from the reference position information in a first direction, second distance information from the reference position information in a second direction, third distance information from the reference position information in a third direction, storable article information, manufacturer information, manager information, product identification information, and combinations thereof.

As shown in FIGS. 3 and 7, the article transfer apparatus 20 according to some embodiments of the present invention may further include a controller 420 for recognizing a reference position P1 based on an image of the detection target captured by or information recognized by the position detection device 400, and recognizing a position spaced apart from the reference position P1 by a first distance L1 in a first direction I and by a second distance L2 in a second direction II or by a third distance (not shown) in a third direction (e.g., a vertical direction), as the correct position P2 in the article storage S serving as the center of alignment of the article F.

Herein, the first direction I, the second direction II, and the third direction may be perpendicular to each other and, for example, the first direction I may indicate the X axis, the second direction II may indicate the Y axis, and the third direction may indicate the Z axis.

As shown in FIG. 7, three alignment bumps T may be disposed on a shelf 33 in a triangular shape with respect to the above-described correct position P2 to correspond to alignment recesses provided in a bottom surface of the article F. For example, when the article F is placed on the shelf 33, the three alignment bumps T of the shelf 33 may be inserted into three alignment recesses of the article F, respectively. The correct position P2 may correspond to a position where the article F is properly placed on the shelf using the alignment recesses of the article F and the alignment bumps T of the shelf 33.

Operation of the article transfer apparatus 20 according to some embodiments of the present invention will now be described. Initially, as shown in FIGS. 2 and 7, while the carriage body is travelling along the travel rails 10 to transfer the article F, the horizontal camera C1 mounted in the carriage body may detect position information related to the correct position P2 in the article storage S where the article F is to be stored, from the detection target 410 mounted at the same height as or within a horizontal detection range of the horizontal camera C1 in the article storage S capable of storing the article F.

Then, as shown in FIG. 4, the hand unit 220 gripping the article F may be extended in a horizontal direction by the horizontal drive unit 250 to accurately position the article F above the correct position P2 based on the detected position information related to the correct position P2.

After that, as shown in FIG. 5, the hand unit 220 gripping the article F may be lowered by the vertical drive unit 230 to place the article F at the correct position P2.

Figure 8:
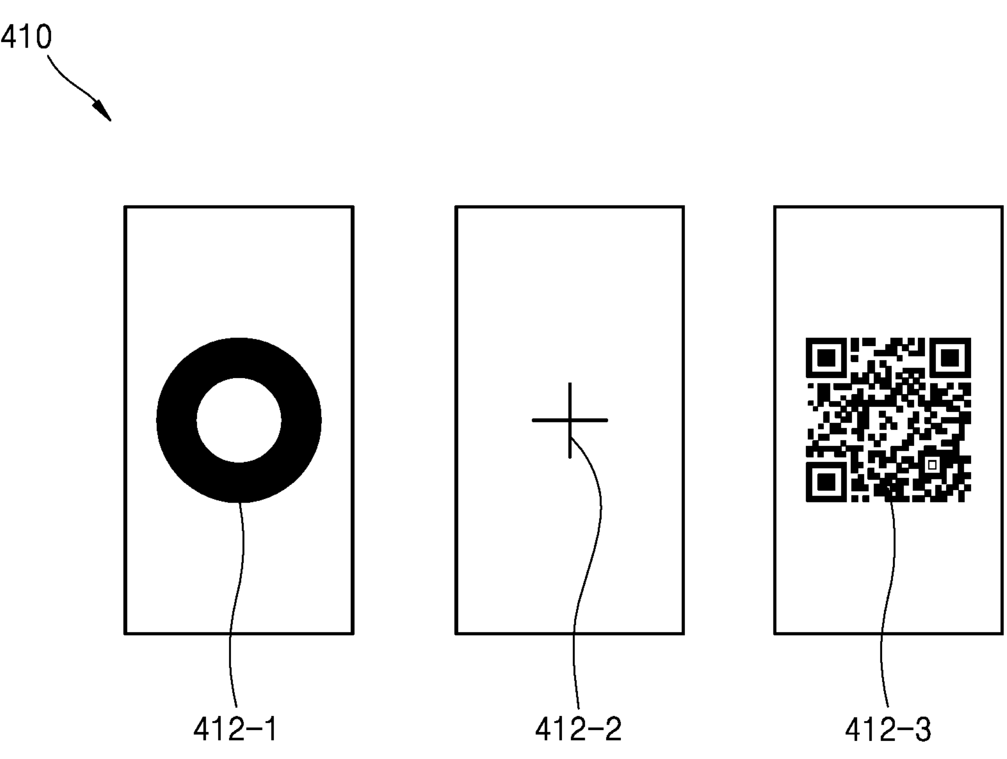
FIG. 8 is a schematic view showing various examples of a detection target of the article transfer apparatus of FIG. 2.

FIG. 8 is a schematic view showing various examples of the detection target 410 of the article transfer apparatus 20 of FIG. 2.

As shown in FIG. 8, the detection target 410 of the article transfer apparatus 20 according to some embodiments of the present invention may selectively include at least one of a circle 412-1, concentric circles, a cross 412-2, scale marks, vertical scale marks, horizontal scale marks, geometric scale marks, and combinations thereof such that the camera C may capture an image thereof to recognize the represented reference position P1.

The detection target 410 is not limited to the illustrations and may use a wide variety of markers capable of making a specific point recognized such that the reference position P1 may be recognized based on an image of the represented shape captured by the camera C.

For example, the center point of the circle 412-1 shown at the left side of FIG. 8 may be specified using an image recognition program, and the point of intersection of the cross 412-2 shown in the middle of FIG. 8 may also be accurately specified.

Therefore, the detection target 410 may use all types of markers capable of making a specific point recognized.

For example, as shown at the right side of FIG. 8, the detection target 410 may selectively include at least one of a quick response (QR) code 412-3, a barcode, various symbol or object identifiers, and combinations thereof such that the camera C may capture an image thereof to recognize the represented information.

Herein, the QR code 412-3 includes corner symbols in three corners and a reference point may be specified using the same, and barcodes and various types of identifiers are also usable.

Figure 9:
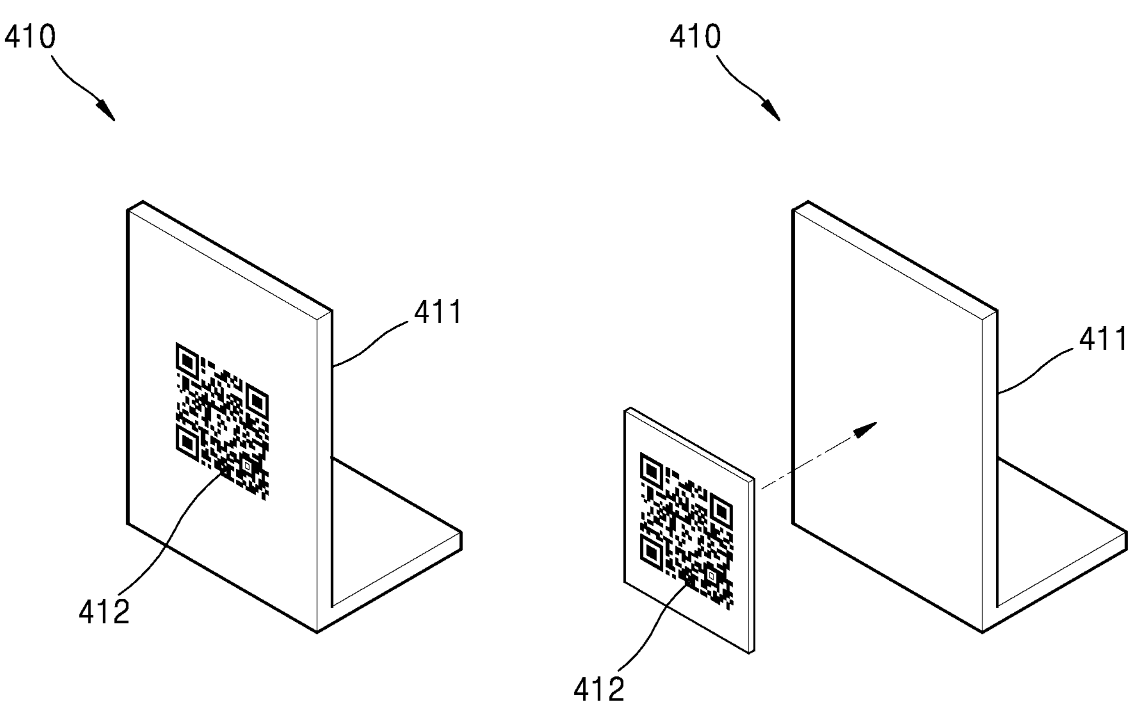
FIG. 9 is a perspective view showing various examples of a detection target of the article transfer apparatus of FIG. 8.

FIG. 9 is a perspective view showing various examples of the detection target 410 of the article transfer apparatus 20 of FIG. 8.

As shown in FIG. 9, the detection target 410 of the article transfer apparatus 20 according to some embodiments of the present invention may stand vertically and include a bracket 411 having a bent shape and mounted in or near the article storage S, and an identifier 412 represented on the bracket 411 (see the left side of FIG. 9) or adhered to the bracket 411 in the form of a sticker (see the right side of FIG. 9).

The bracket 411 may be mounted on, for example, a frame of the article storage S through precise position control by using various fasteners such as screws, bolts, hook-and-loop fasteners, double-sided tape, or an adhesive, and the identifier 412 may be printed, represented, engraved, or embossed on the bracket 411, a sticker, printer paper, or the like.

Therefore, because the correct position P2 at which the article F is to be placed in the article storage S may be accurately recognized by detecting the detection target 410 mounted in the article storage S by using the position detection device 400, a teaching process or a highly skilled worker may not be required, working hours, efforts, and manpower may be greatly reduced, the accuracy or precision of position recognition may be significantly increased, and a collision, a dislocation, a transfer error, or the like of the article F may be prevented by redetecting the correct position P2 whenever the article S is stored even though the article storage S is slightly deformed due to the accumulation of external force for a long time.

Figure 10:
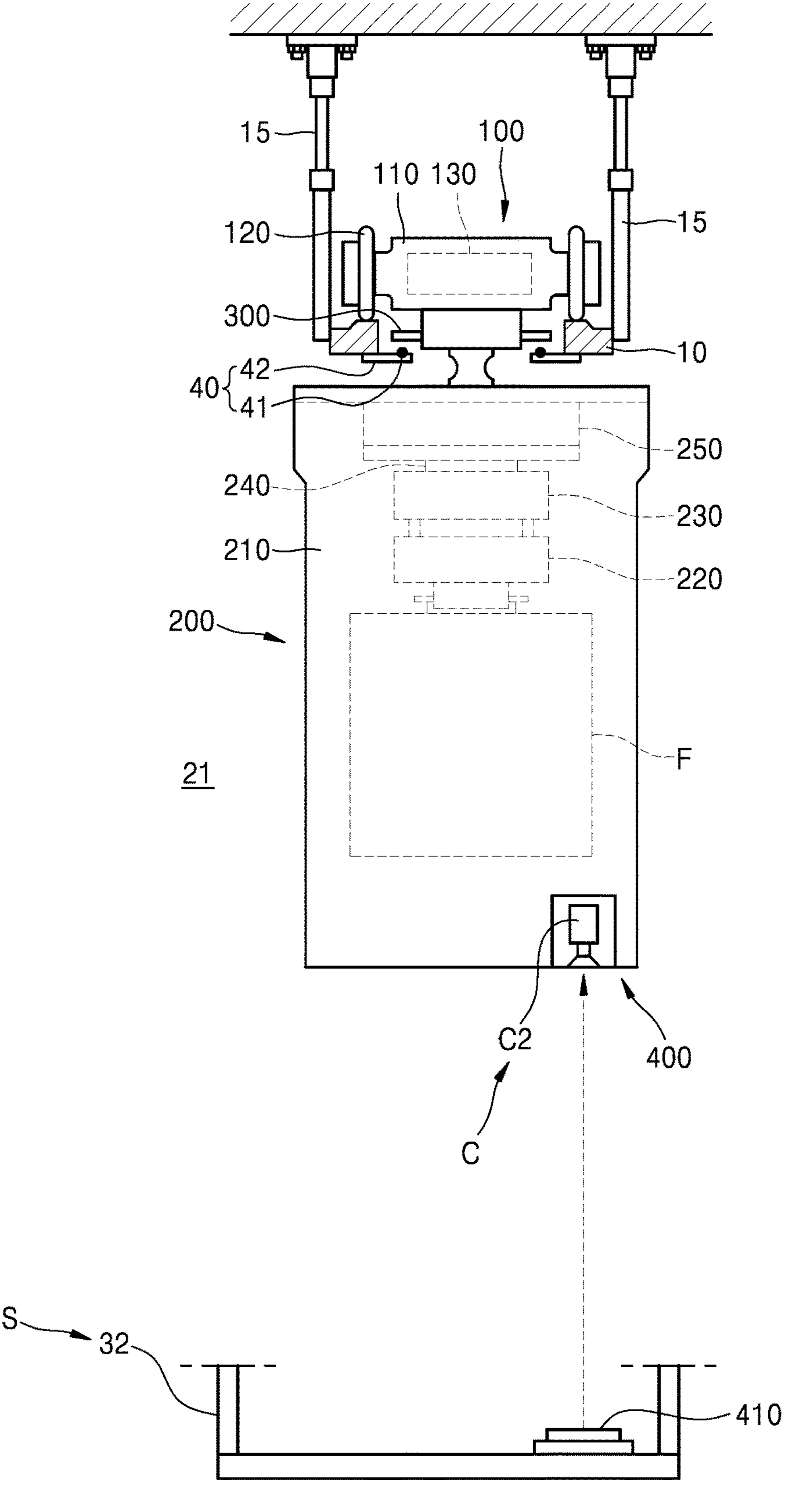
FIG. 10 is a front view of an article transfer apparatus according to other embodiments of the present invention.

FIG. 10 is a front view of an article transfer apparatus 21 according to other embodiments of the present invention.

As shown in FIG. 10, the position detection device 400 of the article transfer apparatus 21 according to other embodiments of the present invention may include a vertical camera C2 having a vertically downward beam angle to capture an image of the detection target 410 which lies horizontally on a UTB 32 or an apparatus stage or port (not shown).

Operation of the article transfer apparatus 21 according to other embodiments of the present invention will now be described. While the carriage body is travelling along the travel rails 10 to transfer the article F, the vertical camera C2 mounted in the carriage body may detect position information related to the correct position P2 in the article storage S where the article F is to be stored, from the detection target 410 mounted immediately below or within a vertical detection range of the vertical camera C2 in the article storage S capable of storing the article F.

In this case, the vertical camera C2 may use an autofocus camera to clearly find out the detection target 410, and the controller 420 may determine a distance by using a focal length of the image captured by the position detection device 400.

Then, the hand unit 220 gripping the article F may be lowered by the vertical drive unit 230 to place the article F at the correct position P2 based on the detected position information related to the correct position P2.

Figure 11:
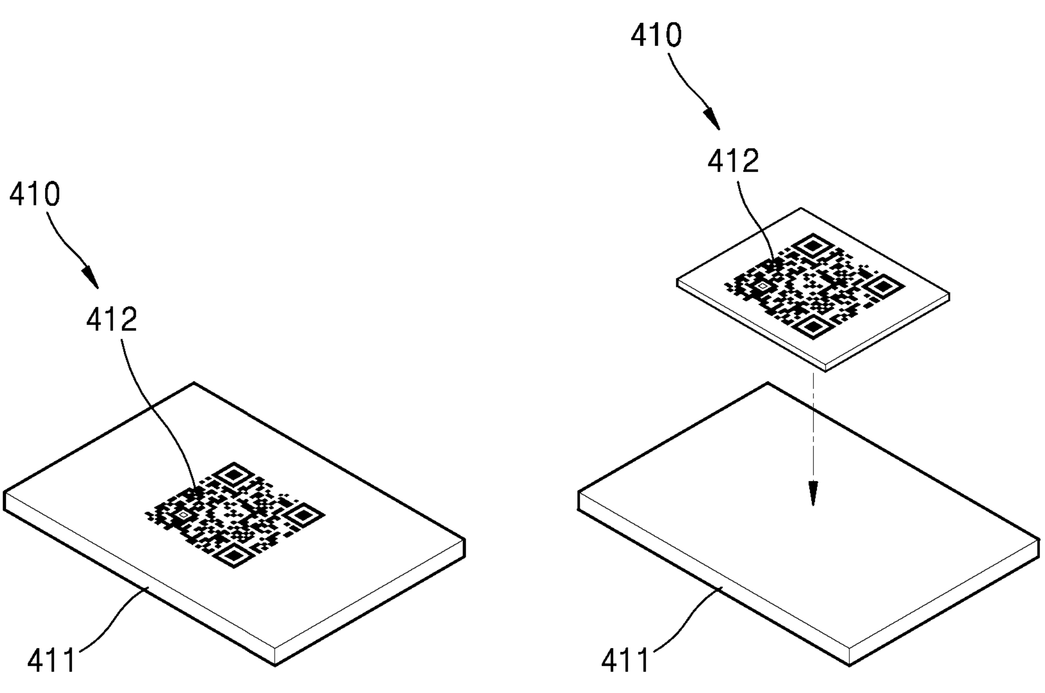
FIG. 11 is a perspective view showing various examples of a detection target of the article transfer apparatus of FIG. 10.

FIG. 11 is a perspective view showing various examples of the detection target 410 of the article transfer apparatus 21 of FIG. 10.

As shown in FIG. 11, the detection target 410 of the article transfer apparatus 21 according to other embodiments of the present invention may lie horizontally and include a bracket 411 having a flat shape and mounted in or near the article storage S, and an identifier 412 represented on the bracket 411 (see the left side of FIG. 11) or adhered to the bracket 411 in the form of a sticker (see the right side of FIG. 11).

The bracket 411 may be mounted on, for example, a frame of the article storage S through precise position control by using various fasteners such as screws, bolts, hook-and-loop fasteners, double-sided tape, or an adhesive, and the identifier 412 may be printed, represented, engraved, or embossed on the bracket 411, a sticker, printer paper, or the like.

Figure 12:
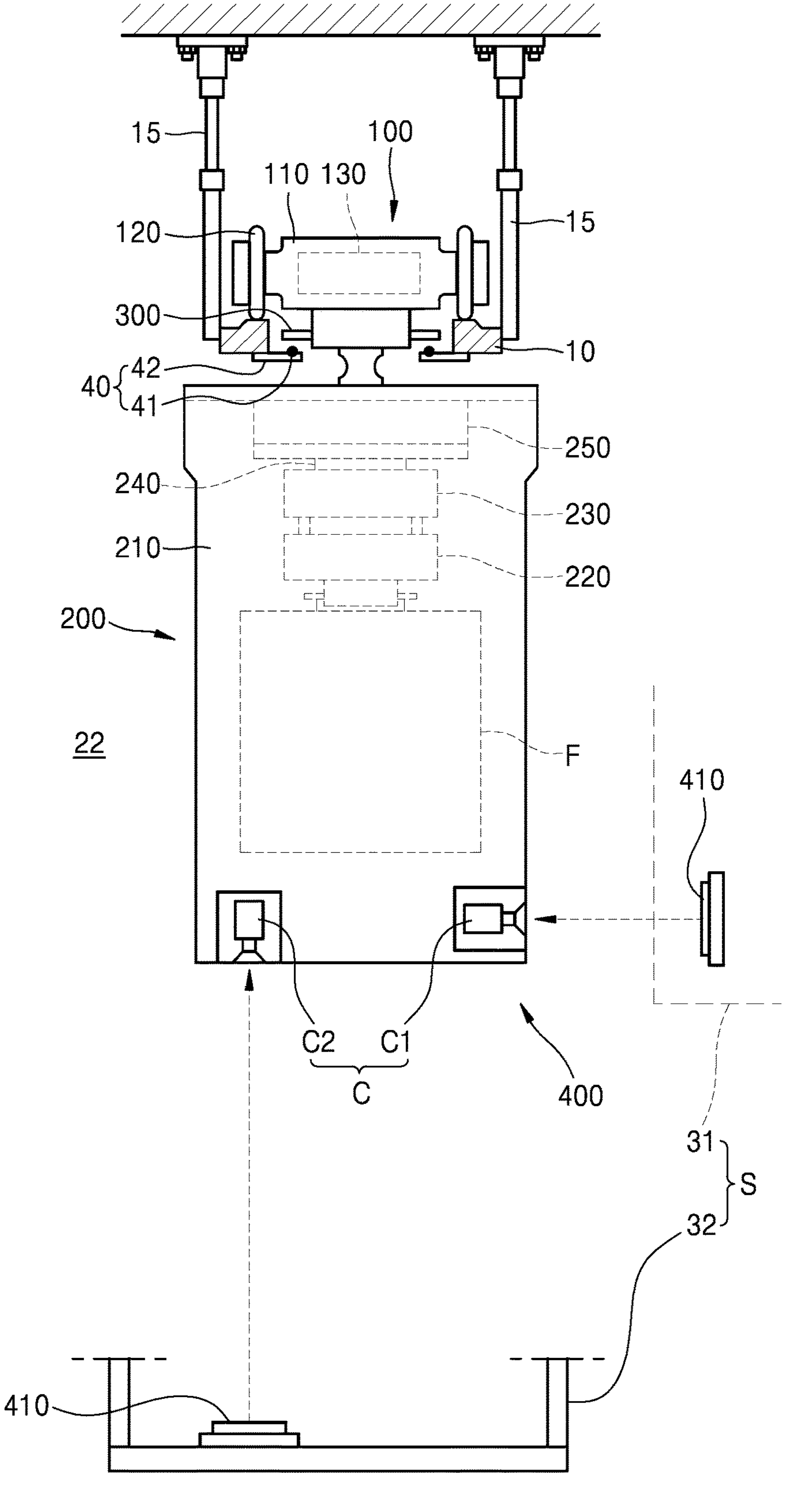
FIG. 12 is a front view of an article transfer apparatus according to other embodiments of the present invention.

FIG. 12 is a front view of an article transfer apparatus 22 according to other embodiments of the present invention.

As shown in FIG. 12, the position detection device 400 of the article transfer apparatus 22 according to other embodiments of the present invention may include both of a horizontal camera C1 mounted in a portion of the carriage body and having a horizontal beam angle to capture an image of the detection target 410 which stands vertically in the STB 31, and a vertical camera C2 mounted in another portion of the carriage body and having a vertically downward beam angle to capture an image of the detection target 410 which lies horizontally on the UTB 32 or the apparatus stage or port.

The position detection device 400 of the article transfer apparatus 22 according to other embodiments of the present invention uses both the two cameras C1 and C2. While the carriage body is travelling along the travel rails 10 to transfer the article F, when the carriage body passes by, for example, the STB 31, the horizontal camera C1 mounted in the carriage body may detect position information related to the correct position P2 in the article storage S where the article F is to be stored, from the detection target 410 mounted at the same height as or within a horizontal detection range of the horizontal camera C1 in the article storage S capable of storing the article F. While the carriage body is travelling along the travel rails 10 to transfer the article F, when the carriage body passes by, for example, the UTB 32 or the apparatus stage or port, the vertical camera C2 mounted in the carriage body may detect position information related to the correct position P2 in the article storage S where the article F is to be stored, from the detection target 410 mounted immediately below or within a vertical detection range of the vertical camera C2 in the article storage S capable of storing the article F.

Therefore, the article F may be autonomously loaded into or unloaded from any type of butter by checking the correct position P2 in the article storage S without a teaching process.

Figure 13:
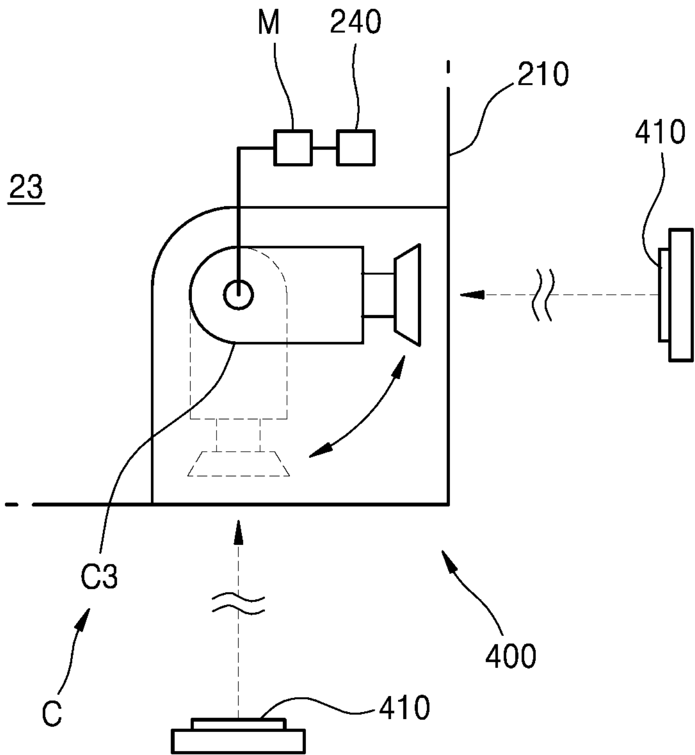
FIG. 13 is an enlarged front view of an article transfer apparatus according to other embodiments of the present invention.

FIG. 13 is an enlarged front view of an article transfer apparatus 23 according to other embodiments of the present invention.

As shown in FIG. 13, the position detection device 400 of the article transfer apparatus 23 according to other embodiments of the present invention may include a variable camera C3 mounted in a portion of the carriage body and having a beam angle variable between a horizontal direction and a vertical downward direction by a drive motor M controlled by the controller 420 to capture an image of the detection target 410 which stands vertically in the STB 31 and an image of the detection target 410 which lies horizontally on the UTB 32 or the apparatus stage or port.

Therefore, various detection targets 410 may be all detected by controlling one variable camera C3 to a horizontal beam angle for the STB 31 or to a vertical beam angle for the UTB 32 or the apparatus stage or port.

Figure 14:
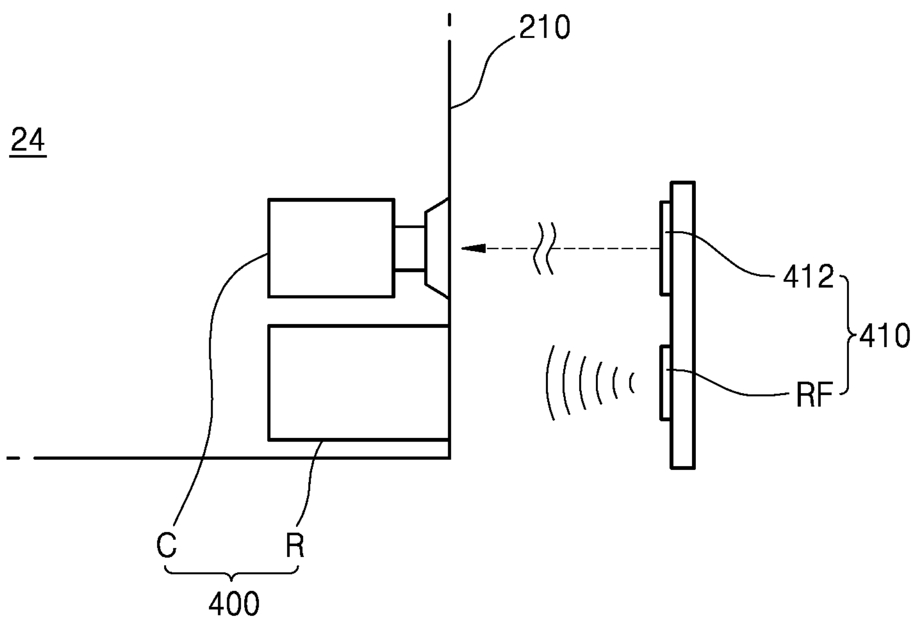
FIG. 14 is an enlarged front view of an article transfer apparatus according to other embodiments of the present invention.

FIG. 14 is an enlarged front view of an article transfer apparatus 24 according to other embodiments of the present invention.

As shown in FIG. 14, the position detection device 400 of the article transfer apparatus 24 according to other embodiments of the present invention may include a camera C for specifying a reference position, and an information reader R capable of reading various types of information such as position information of a correct position with respect to the reference position, and the detection target 410 may include the identifier 412, and an information storage device including at least one of a radio-frequency identification (RFID) chip RF, a near-field communication (NFC) chip, a Bluetooth chip, a Wi-Fi chip, and combinations thereof, which is readable by the information reader R.

Thus, the reference position may be specified using the camera C and other information may be collected using the information reader R to determine the correct position. The information reader R may use a wide variety of types of information readers capable of reading various types of information in a non-contact manner.

Therefore, according to the present invention, because the correct position P2 at which the article F is to be placed in the article storage S may be accurately recognized by detecting the detection target 410 mounted in the article storage S by using the position detection device 400, a teaching process or a highly skilled worker may not be required, working hours, efforts, and manpower may be greatly reduced, the accuracy or precision of position recognition may be significantly increased, and a collision, a dislocation, a transfer error, or the like of the article F may be prevented by newly detecting the correct position P2 whenever the article S is stored even though the article storage S is slightly deformed due to the accumulation of external force for a long time.

Figure 15:
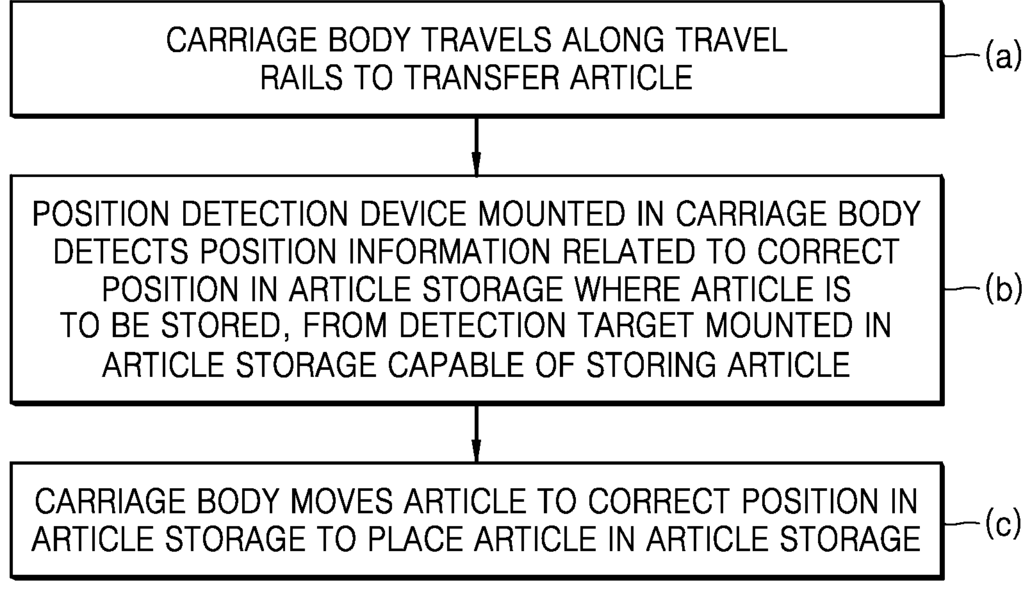
FIG. 15 is a flowchart of an article transfer method according to some embodiments of the present invention.

FIG. 15 is a flowchart of an article transfer method according to some embodiments of the present invention.

As shown in FIGS. 1 to 15, the article transfer method according to some embodiments of the present invention may include (a) travelling, by the carriage body, along the travel rails 10 to transfer the article F, (b) detecting, by the position detection device 400 mounted in the carriage body, position information related to the correct position P2 in the article storage S where the article F is to be stored, from the detection target 410 mounted in the article storage S capable of storing the article F, and (c) moving, by the carriage body, the article F to the correct position P2 in the article storage S to place the article F in the article storage S.

Herein, the controller 420 may recognize the reference position P1 based on an image captured by or information recognized by the position detection device 400, and recognize a position spaced apart from the reference position P1 by the first distance L1 in the first direction I and by the second distance L2 in the second direction II or by the third distance in the third direction, as the correct position P2 in the article storage S serving as the center of alignment of the article F.

For example, in step (b), the controller 420 may determine a distance by using a focal length of the image captured by the position detection device 400.

In step (b), when the article storage S is the STB 31, the horizontal camera C1 having a horizontal beam angle or the variable camera C3 having a beam angle variable from a vertical downward direction to a horizontal direction may be used to capture an image of the detection target 410 which stands vertically or, when the article storage S is the UTB 32 or the apparatus stage or port, the vertical camera C2 having a vertically downward beam angle or the variable camera C3 having a beam angle variable from a horizontal direction to a vertical downward direction may be used to capture an image of the detection target 410 which lies horizontally.

According to the afore-described embodiments of the present invention, because a correct position at which an article is to be placed in an article storage may be accurately recognized by detecting a detection target mounted in the article storage by using a position detection device, a teaching process or a highly skilled worker may not be required, working hours, efforts, and manpower may be greatly reduced, the accuracy or precision of position recognition may be significantly increased, and a collision, a dislocation, a transfer error, or the like of the article may be prevented by newly detecting the correct position whenever the article is stored even though the article storage is slightly deformed due to the accumulation of external force for a long time. However, the scope of the present invention is not limited to the above effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. An article transfer apparatus comprising:

a carriage body travelling along travel rails to transfer an article;

a position detection device mounted in the carriage body and detecting position information related to a correct position from a detection target mounted in an inner space of an article storage configured to store the article in order to place the article at the correct position in the article storage where the article is to be stored; and a controller for determining a distance by using a focal length of an image captured by the position detection device.

2. The article transfer apparatus of claim 1, wherein the position detection device comprises a camera configured to capture an image of the detection target.

3. The article transfer apparatus of claim 2,
wherein the position detection device comprises a horizontal camera having a horizontal beam angle to capture an image of the detection target which stands vertically in a side track buffer (STB).

4. The article transfer apparatus of claim 2,
wherein the position detection device comprises a vertical camera having a vertically downward beam angle to capture an image of the detection target which lies horizontally on an under track buffer (UTB) or an apparatus stage or port.

5. The article transfer apparatus of claim 2,
wherein the position detection device comprises:
a horizontal camera mounted in a portion of the carriage body and having a horizontal beam angle to capture an image of the detection target which stands vertically in a STB; and
a vertical camera mounted in another portion of the carriage body and having a vertically downward beam angle to capture an image of the detection target which lies horizontally on a UTB or an apparatus stage or port.

6. The article transfer apparatus of claim 2,
wherein the position detection device comprises a variable camera mounted in a portion of the carriage body and having a beam angle variable between a horizontal direction and a vertically downward direction to capture an image of the detection target which stands vertically in a STB and an image of the detection target which lies horizontally on a UTB or an apparatus stage or port.

7. The article transfer apparatus of claim 1,
wherein the detection target comprises:
a bracket mounted in or near the article storage; and
an identifier represented on the bracket or adhered to the bracket in a form of a sticker.

8. The article transfer apparatus of claim 1,
wherein the detection target selectively comprises at least one of a circle, concentric circles, a cross, scale marks, vertical scale marks, horizontal scale marks, geometric scale marks, and combinations thereof such that a camera captures an image thereof to recognize a represented reference position.

9. The article transfer apparatus of claim 1,
wherein the detection target selectively comprises at least one of a quick response (QR) code, a barcode, an identifier, and combinations thereof such that a camera captures an image thereof to recognize represented information.

10. The article transfer apparatus of claim 1,
wherein the position detection device comprises a camera and an information reader, and
wherein the detection target comprises an information storage device comprising at least one of a radio-frequency identification (RFID) chip, a near-field communication (NFC) chip, a Bluetooth chip, a Wi-Fi chip, and combinations thereof, which is readable by the information reader.

11. The article transfer apparatus of claim 1,
wherein the detection target represents at least one of identification information of the article storage, storage position information of the article storage, reference position information, first distance information from the reference position information in a first direction, second distance information from the reference position information in a second direction, third distance information from the reference position information in a third direction, storable article information, manufacturer information, manager information, product identification information, and combinations thereof.

12. The article transfer apparatus of claim 1, further comprising a controller for recognizing a reference position based on an image captured by and position-related information recognized by the position detection device, and recognizing a position spaced apart from the reference position by a first distance in a first direction and by a second distance in a second direction or by a third distance in a third direction, as the correct position in the article storage serving as a center of alignment of the article,
wherein the position-related information includes the first distance, the second distance, and the third distance.

13. The article transfer apparatus of claim 1,
wherein the carriage body comprises:
a vehicle travelling along the travel rails; and
a hoist device mounted under the vehicle to support the article and having the position detection device mounted therein.

14. The article transfer apparatus of claim 13,
wherein the hoist device comprises:
a hoist housing for providing an accommodation space for the article and having the position detection device mounted therein;
a hand unit for gripping or ungripping the article; and
a hand moving unit for moving the hand unit from the accommodation space to the correct position in the article storage.

15. An article transfer method comprising:
(a) travelling, by a carriage body, along travel rails to transfer an article;
(b) detecting, by a position detection device mounted in the carriage body, position information related to a correct position in an article storage where the article is to be stored, from a detection target mounted in an inner space of the article storage configured to store the article; and
(c) moving, by the carriage body, the article to the correct position in the article storage to place the article in the article storage, wherein, in step (b), a controller determines a distance by using a focal length of an image captured by the position detection device.

16. The article transfer method of claim 15,
wherein, in step (b), a controller recognizes a reference position based on an image captured by or information recognized by the position detection device, and recognizes a position spaced apart from the reference position by a first distance in a first direction and by a second distance in a second direction or by a third distance in a third direction, as the correct position in the article storage serving as a center of alignment of the article.

17. The article transfer method of claim 15,
wherein, in step (b), when the article storage is a side track buffer (STB), a horizontal camera having a horizontal beam angle or a variable camera having a beam angle variable from a vertically downward direction to a horizontal direction is used to capture an image of the detection target which stands vertically or, when the article storage is an under track buffer (UTB) or an apparatus stage or port, a vertical camera having a vertically downward beam angle or a variable camera having a beam angle variable from a horizontal direction to a vertical downward direction is used to capture an image of the detection target which lies horizontally.

18. An article transfer apparatus comprising:

a carriage body travelling along travel rails to transfer an article;

a position detection device mounted in the carriage body and detecting position information related to a correct position from a detection target mounted in an inner space of an article storage configured to store the article in order to place the article at the correct position in the article storage where the article is to be stored; and a controller for recognizing a reference position based on an image captured by or information recognized by the position detection device, and recognizing a position spaced apart from the reference position by a first distance in a first direction and by a second distance in a second direction or by a third distance in a third direction, as the correct position in the article storage serving as a center of alignment of the article, wherein the position detection device comprises a camera configured to capture an image of the detection target, wherein the position detection device comprises a variable camera mounted in a portion of the carriage body and having a beam angle variable between a horizontal direction and a vertically downward direction to capture an image of the detection target which stands vertically in a STB and an image of the detection target which lies horizontally on a UTB or an apparatus stage or port, wherein the carriage body comprises:

a vehicle travelling along the travel rails; and a hoist device mounted under the vehicle to support the article, and wherein the hoist device comprises:

a hoist housing for providing an accommodation space for the article and having the position detection device mounted therein;

a hand unit for gripping or ungripping the article; and a hand moving unit for moving the hand unit from the accommodation space to the correct position in the article storage.

* * * * *